Oct. 30, 1956
A. W. RICHARDSON
2,769,141
APPARATUS FOR MEASURING BLOOD COAGULATION TIME AND ENZYME ACTIVITY
Filed June 1, 1953
2 Sheets-Sheet 1
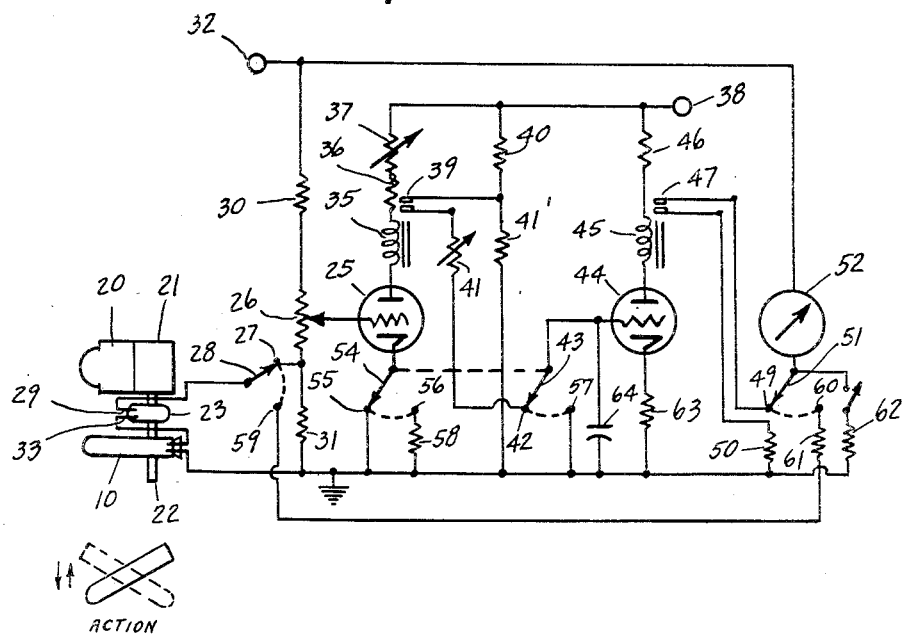
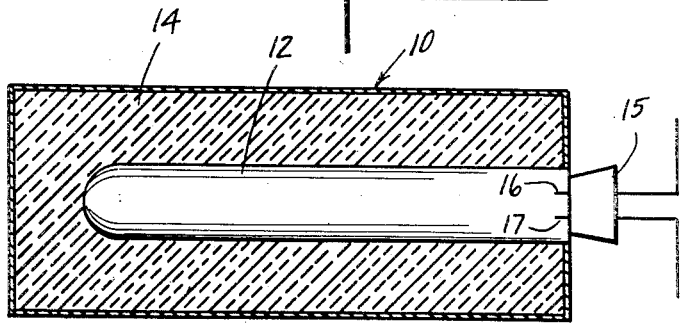
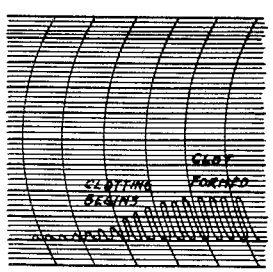
INVENTOR.
ALFRED W. RICHARDSON.
BY
Lockwood, Galt, Woodard & Smith.
ATTORNEYS.

Oct. 30, 1956  A. W. RICHARDSON  2,769,141
APPARATUS FOR MEASURING BLOOD COAGULATION TIME
AND ENZYME ACTIVITY
Filed June 1, 1953  2 Sheets-Sheet 2

INVENTOR.
ALFRED W. RICHARDSON.
BY
Lockwood, Galt, Woodard & Smith.
ATTORNEYS.

United States Patent Office 2,769,141
Patented Oct. 30, 1956

2,769,141

APPARATUS FOR MEASURING BLOOD COAGULATION TIME AND ENZYME ACTIVITY

Alfred W. Richardson, Bloomington, Ind., assignor to Indiana University Foundation, Bloomington, Ind., a corporation of Indiana Application June 1, 1953, Serial No. 358,927

10 Claims. (Cl. 324—30)

This invention relates generally to electrical measuring apparatus and more particularly to a method and apparatus for measuring and recording blood coagulation time.

It has been suggested that blood coagulation time may be measured electrically by means of apparatus for measuring changes of electrical conductivity occurring as the blood coagulates. For example, one conventional apparatus consists of an alternating current bridge circuit in combination with a high gain electrical amplifier. This apparatus includes electrodes immersed in a quantity of blood, and the circuit measures the changes in electrical conductivity as the blood between the electrodes coagulates. The difference between the conductivity of blood in liquid form and coagulated form is relatively small and, therefore, a high gain amplifier introduces errors such as those which might occur due to temperature variation of the blood during the coagulation period. Therefore, it is necessary to utilize apparatus for maintaining the temperature constant. This particular apparatus is subject to another objection in that the probes are always immersed in the blood and measure directly the change of conductivity of the blood as it clots. Since this change of resistance is minute, the resistance of the probes themselves can not be permitted to change and, accordingly, the same probes must always be used in successive measurements in order to avoid recalibration of the instruments when a different set of probes are utilized.

Accordingly, the principal object of this invention is to provide a method and apparatus of measuring blood coagulation time which measures the changes in conductivity of a blood clot between the period of its initial formation and the time of its final formation.

Another object of this invention is to provide a method and apparatus of measuring blood coagulation time which is insensitive to all variables except the conductivity of the blood during the period that it is coagulating or clotting.

Another object of this invention is to provide a method and apparatus for measuring enzyme activity.

In accordance with this invention there is provided apparatus for measuring blood coagulation time comprising means adapted periodically to immerse a pair of electrical probes in a quantity of blood, and an electrical circuit adapted to detect the initial change of electrical conductivity between said probes when a clot begins to form and periodically to measure said conductivity during the coagulation or clotting period.

Further in accordance with this invention there is provided a method of measuring blood coagulation time comprising the steps of periodically immersing a pair of spaced electrical probes in a quantity of blood, connecting an amplifier circuit to said probes between said periodic immersions, generating electrical impulse when a predetermined amount of current flows between said probes in response to initiation of formation of a clot between said probes, and recording subsequent impulses generated in response to subsequent immersions of said probes in the blood.

The full nature of the invention will be understood from the accompanying drawings and the following description and claims:

Fig. 1 is a schematic illustration of a mechanism and a circuit provided in accordance with the invention.

Fig. 2 is an enlarged cross sectional view of a blood container adapted to be utilized for measuring blood coagulation time in the apparatus shown in Fig. 1.

Fig. 3 is a diagram illustrating one form of the record produced in the apparatus illustrated in Fig. 1.

Figure 4:
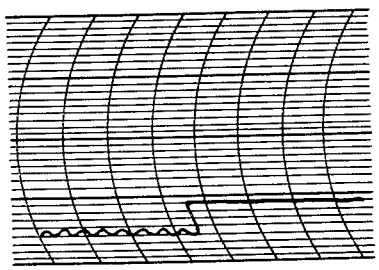
Fig. 4 is a diagram illustrating another form of the record produced in the apparatus illustrated in Fig. 1.

Referring to the drawings, this invention comprises a blood container 10 consisting of an outer casing member 11 within which is supported in any suitable fashion a small tubular container 12 (Fig. 2) for containing a predetermined quantity of blood. The container 10 may be evacuated to insulate the tube 12 against ambient changes of temperature, or insulating material 14 may be packed around the tube 12. For closing the container 12 there is provided a rubber or cork stopper 15 in which may be supported a pair of electrically conductive non-corrosive probes 16 and 17 in spaced relation to one another. Preferably the probes 16 and 17 should consist of two stainless steel rods approximately three millimeters in diameter protruding approximately 0.2 of a millimeter beyond the inner surface of stopper 15 and being spaced from one another approximately 3.5 millimeters.

For oscillating the blood container through an angle of approximately 90°, there is provided a motor 20 (Fig. 1), a suitable gear mechanism 21 and a shaft 22 connected thereto on which a container 10 can be mounted in any conventional fashion, as illustrated in Fig. 1. The gear mechanism 21 may be of any conventional form so long as it is adapted to impart an oscillating motion through an angle of 90° to container 10 at the rate of one complete oscillation every ten seconds. Thus, the container 10 is tipped every ten seconds to immerse the probes 16 and 17 within the blood. The inner surface of tube 12 and the stopper 15 may be coated to provide a non-wettable surface, such a coating comprising paraffin oil or any equivalent substance. This is desirable in order to prevent accumulation of blood on the inner surfaces of tube 12 and between electrodes 16 and 17 which would create a conductive surface between the electrodes and cause false electrical conductivity.

Also mounted on the shaft 22 is a mercury switch 23 oriented with respect to the container 10 so that the switch opens when probes 16 and 17 are immersed in blood and closes when the container 10 is tilted to the full line position illustrated in Fig. 1 and when the blood flows away from probes 16 and 17. The significance of this orientation will become evident from subsequent description.

An electrical circuit is connected to the terminals of switch 23 and to the probes 16 and 17 which comprises first amplifier tube 25, the control-grid circuit of which is connected through a potentiometer 26, a switch contact 27, and switch 28 to terminal 29 of mercury switch 23. Potentiometer 26 is connected in series with resistors 30 and 31 between the source of voltage 32 and probe 17, or ground. Probe 16 and contact 33 of switch 23 are connected together as illustrated. The anode circuit of tube 25 is connected to a relay 35 and through resistor 36 and potentiometer 37 to a source of anode voltage 38.

Relay 35 is provided with a pair of contacts 39 which are connected in series with resistor 40, adjustable resistance 41, contact 42, switch 43 and the grid-control circuit of a second amplifier tube 44. The grid control circuit of tube 44 includes a condenser 64 which forms a time constant circuit with resistor 41. The anode circuit of tube 44 is connected to a relay 45 and the source of voltage 38 through a resistor 46. Relay 45 includes a pair of contacts 47 connected between a switch contact 49 and resistor 50, contact 49 being connectable with switch 51 and a recording meter 52 connected to the source of voltage 32.

Figure 5:
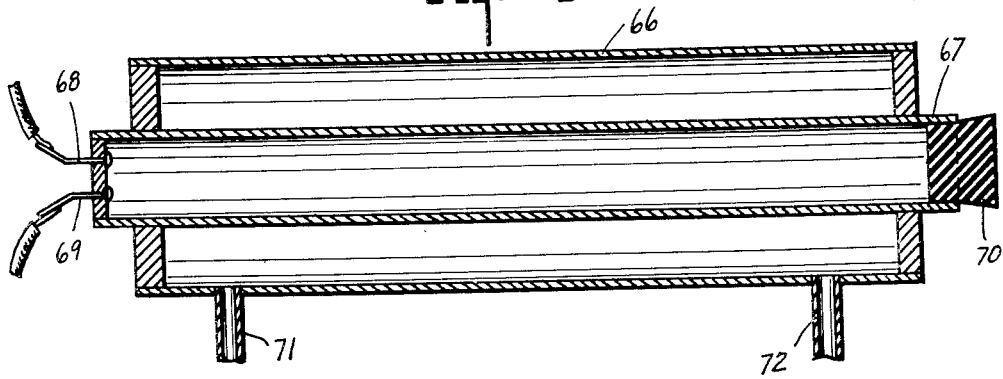
Fig. 5 is an enlarged cross sectional view of a container adapted to be utilized for measuring enzyme activity in the apparatus shown in Fig. 1.

Fig. 5 illustrates a form of container particularly adapted to be used in place of container 10 for measuring enzyme activity. The container comprises an outer casing 66, the end portions of which support a tube 67 in sealed relation to the container. The tube is adapted to receive a fluid such as blood containing enzymes and differs from the tube 12 of container 10 in that the probes 68 and 69 are mounted in the opposite end from the stopper 70. This modification of the invention illustrates another method of maintaining constant temperature around tube 67 in that two water connections 71 and 72 are provided for circulating water of constant temperature within container 66 and around tube 67.

This invention may be used for measuring the time elapsing between withdrawal of venous blood and formation of a clot. Accordingly, venous blood may be withdrawn into the tube 12, and the clock mechanism controlling recording meter 52 may be started simultaneously with such withdrawal. Thus, meter 52 commences tracing a time curve at the time that venous blood is withdrawn. The container 10 and therewith tube 12 is then continuously oscillated by motor 20 and shaft 22. Probes 16 and 17 are immersed in the blood at ten second intervals, and switch 23 is arranged to close between immersions of probes 16 and 17.

Potentiometer 26 may be adjusted to so bias the grid of tube 25 that this tube is not conductive until such time as the blood in container 10 has coagulated to such a degree that a clot commences to form between probes 16 and 17. Prior to such formation, resistance between these probes will be infinite and, hence, tube 25 will be non-conductive. As soon as the initiation of a clot occurs, the clot will form a conductive path having a certain predictable resistance whereby such current may flow through potentiometer 26 and resistor 31 as to bias tube 25 to an operative condition whereby current may flow through relay 35 sufficient to effect closure of contacts 39.

Contacts 39 closing energize the grid circuit of tube 44 consisting of variable resistor 41 and condenser 64. The time period of complete formation of a clot after its initial formation has started is known and, therefore, the time constant circuit consisting of resistor 41 and condenser 64 is adjusted to have a time constant of approximately twenty seconds, which is the known time period between initiation of a clot and its complete formation. Therefore, twenty seconds after closure of contacts 39 time constant circuit 41, 64 will have biased tube 44 into a conductive condition whereby its anode circuit will energize relay 45 and close contacts 47. Switch 49 is positioned as indicated in Fig. 1, whereby closure of contacts 47 energizes the recording pen of meter 52, causing it to trace a square wave pulse such as that shown in Fig. 4. Thus, the tracing of the recording meter 10 extends over a period commencing at the time of withdrawal of venous blood and ending at the time of complete clot formation. The time of complete clot formation may be determined by a relatively unskilled person due to the fact that the leading edge of the square wave pulse gives a clear and exact indication of termination of the clot formation time.

Another mode of operation comprises adjusting switch 28 into contact with terminals 59 and switch 51 into contact with terminal 60. Operation of these switches connects the mercury switch 23 and probes 16 and 17 in series between the recording meter 52 and ground. Tubes 25 and 44 and, therefore, associated circuit elements do not function in this mode of operation. In measuring blood coagulation time by the second method, the recording meter 52 may be started at the time of withdrawing venous blood, and oscillation of container 10 and switch 23 will cause periodic immersion of probes 16 and 17, producing a series of low amplitude pulses on meter 52 which represent the conductivity of liquid blood between probes 16 and 17. As soon as a clot commences to form between probes 16 and 17, the conductivity between the probes gradually increases, producing recorded pulses of increasing amplitude until a clot has been formed, as illustrated in Fig. 3.

These pulses of gradually increasing amplitude illustrate the increase in electrical conductivity of the clot as its formation progresses, the amplitude of the pulses being at a minimum at the beginning of the clot formation and reaching a maximum when the clot has finally formed. The pulses occur at the ten second intervals and, therefore, by measuring the number of pulses recorded between the pulses of minimum and maximum amplitude, the time of coagulation or clotting may be determined.

When it is desired to measure enzyme activity, the latter described mode of operation is employed, but the container of Fig. 5 is substituted for container 10. Operation of the circuit will be obvious to those skilled in the art.

In order to re-set relays 35 and 45 after a clot measuring cycle, there is provided a switch 54 mechanically coupled with switch 43. Switch 54 normally connects the cathode of tube 25 to ground through contact 55, while switch 43 normally connects contacts 39 and resistor 41 to the grid of tube 44. By moving switches 43 and 54 to contacts 55 and 57, respectively, the grid of tube 44 is grounded and the cathode of tube 25 is connected to ground through resistor 58, whereby relays 35 and 45 are de-energized and re-set for a subsequent measuring cycle.

In order to illustrate an operative embodiment of this invention, circuit components having the indicated values are shown in the following table. It is to be understood, however, that circuits of different design are capable of operating to produce the desired result.

| | | |
|---|---|---:|
| Resistor 26 | ohms | 7,500 |
| Resistor 30 | do | 10,000 |
| Resistor 31 | do | 22,000 |
| Resistor 36 | do | 3,300 |
| Resistor 37 | do | 100,000 |
| Resistor 40 | megohms | 10 |
| Resistor 41 | do | 10 |
| Resistor 41' | do | 3 |
| Resistor 46 | ohms | 6,800 |
| Resistor 50 | do | 3,300 |
| Resistor 61 | do | 1,000 |
| Resistor 62 | do | 6,800 |
| Resistor 58 | do | 4,700 |
| Resistor 63 | do | 3,300 |
| Condenser 64 | mf | 16 |
| Tube 25 | Type | ½ 6SN7 |
| Tube 44 | Type | ½ 6SN7 |
| Source 32 | volts | 6 |
| Source 38 | do | 300 |

From the foregoing description it will be apparent that the apparatus provided in accordance with this invention is adapted to measure directly the resistance or electrical conductivity of a blood clot only. Since the apparatus does not normally show the resistance of liquid blood, it cannot show anything except the time required for blood coagulation or clotting. A high gain amplifier is not required and, hence, occurrence of error is minimized. More particularly, effects of ambient temperature are minimized so that only variations of conductivity due to clot formation are recorded.

This invention has the further advantage that there is a minimum of subjective error. Agitation of the blood is controlled, and reproduceable, permanent recordings may be made.

The invention claimed is:

1. Apparatus for measuring blood coagulation time comprising a container having a non-wettable interior surface and adapted to contain a predetermined quantity of blood, a pair of spaced probes supported within one end of said container, means for rotatably oscillating said container through an angle of approximately 90° to intermittently immerse said probes in blood, and an electrical circuit connected to said probes comprising a mercury switch connected to said oscillating means in a manner to close said circuit only when said container is in a non probe immersing position, a triggering tube coupled to said switch and said probes and biased to become conductive when the conductivity of blood between said probes reaches a predetermined minimum value, a continuously operative recording meter, and timed relay means coupled to the output circuit of said triggering tube and responsive to the output energy thereof for connecting said meter to a source of potential a predetermined time after said triggering tube is conductive, and producing a recorded time spaced pulse corresponding to the coagulation period of blood between said probes.

2. Apparatus for measuring blood coagulation time comprising a container adapted to contain a predetermined quantity of blood, a pair of spaced probes supported within one end of said container, means for oscillating said container to intermittently immerse said probes in blood, and an electrical circuit connected to said probes comprising a switch connected to said oscillating means in a manner to close said circuit only when said container is in a non probe immersing position, a triggering tube coupled to said switch and said probes and biased to become conductive when the conductivity of blood between said probes reaches a predetermined minimum value, a continuously operative recording meter, switching means coupled to said triggering tube and responsive to the output energy thereof for energizing said meter and producing a recorded time spaced pulse corresponding to the coagulation period of blood between said probes.

3. Apparatus for measuring blood coagulation time comprising a container adapted to contain a predetermined quantity of blood, a pair of spaced probes supported within said container, means for intermittently immersing said probes in blood, and an electrical circuit connected to said probes comprising a mercury switch operative in a manner to close said circuit only when said probes are not immersed in blood, a continuously operative recording meter, switching means coupled to said switch and responsive to the output energy thereof for energizing said meter when the conductivity between said probes reaches a predetermined value, and producing a recorded time spaced pulse corresponding to the coagulation period of blood between said probes, and a circuit between said probes and said meter shunting said electrical circuit and said switching means and connectable for energizing said meter directly to record a series of time spaced pulses generated by said mercury switch and varying in amplitude with the conductivity of a clot between said probes.

4. Apparatus for measuring blood coagulation time comprising a container adapted to contain a predetermined quantity of blood, a pair of spaced probes supported within said container, means for intermittently immersing said probes in blood, and an electrical circuit connected to said probes comprising a switch operative in a manner to close said circuit only when said probes are not immersed in blood, a continuously operative recording meter, and switching means coupled to said switch and responsive to the output energy thereof for energizing said meter when the conductivity between said probes reaches a predetermined value, and producing a recorded time spaced pulse corresponding to the coagulation period of blood between said probes.

5. Apparatus for measuring blood coagulation time comprising a container adapted to contain a predetermined quantity of blood, a pair of spaced probes supported within one end of said container, means for immersing said probes in blood, and an electrical circuit connected to said probes comprising a triggering tube coupled to said probes and biased to become conductive when the conductivity of blood between said probes reaches a predetermined minimum value, a continuously operative recording meter, and switching means coupled to said triggering tube and responsive to energy thereof for energizing said meter a certain time after said triggering tube is conductive, and producing a recorded time spaced pulse corresponding to the coagulation period of blood between said probes.

6. Apparatus for measuring blood coagulation time comprising a container adapted to contain a predetermined quantity of blood, a pair of spaced probes supported within one end of said container, means for intermittently immersing said probes in blood, and an electrical circuit connected to said probes comprising a switch operative in a manner to close said circuit only when said probes are not immersed in blood and a continuously operative recording meter, switching means coupled to said probes for energizing said meter a certain time interval after the conductivity between said probes reaches a predetermined value, and producing a recorded time spaced pulse corresponding to the coagulation period of blood between said probes, and a circuit between said probes and said meter shunting said switching means and connectable for energizing said meter directly to record a series of time spaced pulses varying in amplitude with the conductivity of a clot between said probes.

7. Apparatus for measuring blood coagulation time comprising a container adapted to contain a predetermined quantity of blood, a pair of spaced probes supported within one end of said container, means for intermittently immersing said probes in blood, and an electrical circuit connected to said probes comprising a continuously operative recording meter, and switching means coupled to said probes for energizing said meter a certain time interval after the conductivity between said probes reaches a predetermined value, and producing a recorded time spaced pulse corresponding to the coagulation period of blood between said probes.

8. Apparatus for measuring coagulation time of a coagulant comprising a container adapted to contain a predetermined quantity of said coagulant, a pair of spaced probes supported within one end of said container, means for intermittently immersing said probes in said coagulant, and an electrical circuit connected to said probes comprising a recording meter, and a switch operative in a manner to close said circuit intermittently in timed relation to operation of said intermittent immersing means for energizing said meter to record a series of time spaced pulses varying in amplitude with conductivity of coagulant suspended between said probes.

9. Apparatus for measuring coagulation time of a coagulant comprising a container adapted to contain a predetermined quantity of said coagulant, a pair of spaced probes supported withine one end of said container, means for intermittently immersing said probes in said coagulant, an electrical circuit for indicating changes of electrical resistance, and a switch coupled to said probes and to said electrical circuit and operative in a manner to actuate said electrical circuit intermittently in timed relation to operation of said intermittent immersing means for energizing said circuit between immersions of said probes to indicate conductivity of coagulant suspended between said probes.

10. Apparatus for measuring coagulation time of a coagulant comprising a container adapted to contain a predetermined quantity of said coagulant, a pair of spaced probes supported within one end of said container, means for intermittently immersing said probes in said coagulant, and electrical means coupled to said probes for measuring conductivity of coagulant suspended between said probes only when said probes are not immersed in said coagulant.

References Cited in the file of this patent

UNITED STATES PATENTS

| | | |
|---|---|---|
| 1,860,397 | Slawinski | May 31, 1932 |
| 2,555,937 | Rosenthal et al. | June 5, 1951 |
| 2,651,751 | Heath | Sept. 8, 1953 |